H. U. SMITH.
DRIVING BELT.
APPLICATION FILED AUG. 1, 1912.
1,053,748.
Patented Feb. 18, 1913.
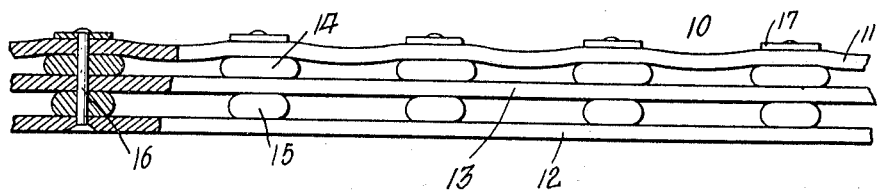
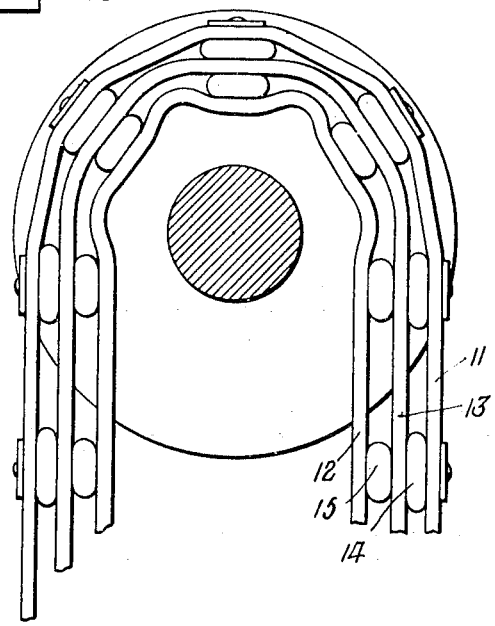
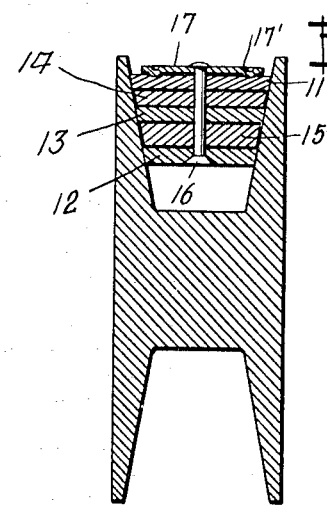
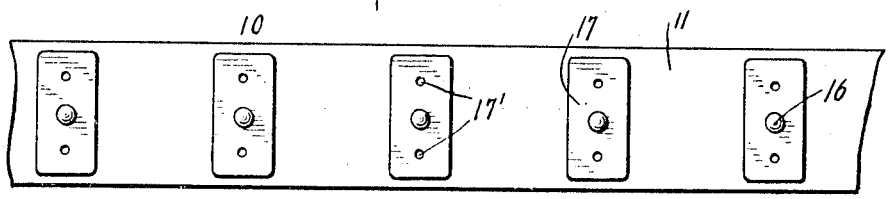
WITNESSES
INVENTOR
Herbert U. Smith.
BY Munn & Co
ATTORNEYS

UNITED STATES PATENT OFFICE.

HERBERT U. SMITH, OF COLUMBUS, OHIO.

DRIVING-BELT.

1,053,748.  Specification of Letters Patent.  Patented Feb. 18, 1913.

Application filed August 1, 1912. Serial No. 712,628.

*To all whom it may concern:*

Be it known that I, HERBERT U. SMITH, a citizen of the United States, and a resident of Columbus, in the county of Franklin and State of Ohio, have invented a new and Improved Driving-Belt, of which the following is a full, clear, and exact description.

This invention relates to belt gearing, and has particular reference to a driving belt for use in high speed transmission devices and particularly in connection with belt gearing in which there is employed a power pulley of relatively small diameter.

A further object of the invention is to improve that class of belts which are commonly used on motor cycles and the like in which the pulleys are provided with V-grooves.

More particularly stated, my object in this character of the belt is to increase the flexibility of the belt without detracting materially from its efficiency either as to tensile strength or frictional properties.

The foregoing and other objects of the invention will hereinafter be more fully described and claimed and illustrated in the drawings accompanying this specification in which like characters of reference indicate corresponding parts in all the views, and in which—

Figure 1 is a side view of a fragment of the belt, one portion of it being in longitudinal section; Fig. 2 is a side elevation showing the form of the belt when operating in connection with a small pulley; Fig. 3 is a transverse section of the same; and Fig. 4 is a top plan view of the belt.

Referring particularly to the drawings the numeral 10 will be understood as indicating a driving belt made in accordance with this invention and comprising outer, inner and intermediate sections 11, 12 and 13, respectively, of any suitable flexible material. These sections are spaced each from the other by spacing blocks 14 and 15, the blocks 14 being wider both transversely and longitudinally than the other blocks, but the latter being thicker than the former. As shown in Figs. 1 and 2 especially, the blocks 14 and 15 are provided with rounded edges so as to obviate any possibility of the cutting or abrasion of the belt sections in passing around the pulleys.

As a convenient and preferred means for securing the several parts of the belt together in connection with the spacing blocks, I prefer to employ at each joint a single smooth round rivet 16, and secured thereby to the outer section 11 is a flat plate or washer 17. The plate 17 is slightly less in length than the width of the belt to which it is connected, as shown in Fig. 3, but the plate in connection with the spacing blocks is of such substantial length as to maintain the belt practically straight in cross section instead of permitting the belt to bend or sag due to the friction of its sides and the opposing faces of the pulley groove. In order to prevent the plates 17 from becoming twisted or displaced, I prefer to form each of them with points or projections 17' which engage with the outer surface of the section 11 but without damaging the same. As shown in Fig. 1, the plates 17, as viewed in the direction of the belt, are preferably slightly narrower than the spacing blocks 14, and by virtue of the rivets holding the several parts together firmly there will be no opening or spacing allowed between the front and rear edges of the plates and the belt when passing around short turns.

In the construction of this driving belt any suitable materials may be used, and the relative sizes and proportions may be varied from those indicated without materially departing from the spirit of the invention.

Having thus described my invention what I claim as new and desire to secure by Letters Patent is:—

The herein described driving belt comprising a series of substantially parallel flexible belt sections, spacing blocks between the respective sections, one set of spacing blocks being wider and thinner than the other and having rounded edges for coöperation with the belt sections, and means passing through the belt sections and spacing blocks, securing said parts firmly together.

In testimony whereof I have signed my name to this specification in the presence of two subscribing witnesses.

HERBERT U. SMITH.

Witnesses:
 ADDIE M. DAVIS,
 ADDIE A. MILLER.